March 6, 1928.

J. FEJES 1,661,218

BRAKE DRUM

Original Filed May 28, 1926   2 Sheets-Sheet 2

J. Fejes INVENTOR

By Marks & Clark ATTYS.

Patented Mar. 6, 1928.

1,661,218

UNITED STATES PATENT OFFICE.

JENÖ FEJES, OF BUDAPEST, HUNGARY.

BRAKE DRUM.

Original application filed May 28, 1926, Serial No. 112,343. Divided and this application filed December 30, 1926. Serial No. 158,067.

This invention relates to an improved construction of brake drums for motor and like vehicles.

Brake drums are known to which a disc of sheet metal is welded to a cylindrical portion of cast metal.

The main object of the invention is so to construct and mount the brakes and parts associated therewith that their dynamic forces and in consequence thereof also the vibrations which are usually transmitted by the said dynamic forces to the main springs, chassis frame, etc., are substantially reduced.

This main object is attained by making not only the disc-like portion, but also the cylindrical portion of the brake drum of strips of sheet iron welded together as hereinafter more particularly described. By thus constructing the brake drum, its weight and consequently its forces of inertia are greatly reduced as compared with the forces of inertia which are produced when the brake drum is much heavier as has been the case with the constructions hitherto employed.

The construction according to the present invention has the further advantage that the heat is rapidly radiated and overheating entirely prevented. A still further advantage consists in the great reduction in the cost of manufacture which is due not only to the smaller price of the material as compared with the material hitherto employed but also to the facts that as the vibrations to which the vehicle is subjected are substantially reduced, the various parts of the vehicle, such as the main springs, can be made of smaller dimensions for the same factor of safety, and as the heat is so readily radiated no extra provision has to be made for cooling the brakes in order to prevent overheating.

It is also to be pointed out that owing to the masses of the movable parts being much lighter than the masses of the brakes hitherto employed, the efficiency of the improved brake is correspondingly increased.

Figure 1:
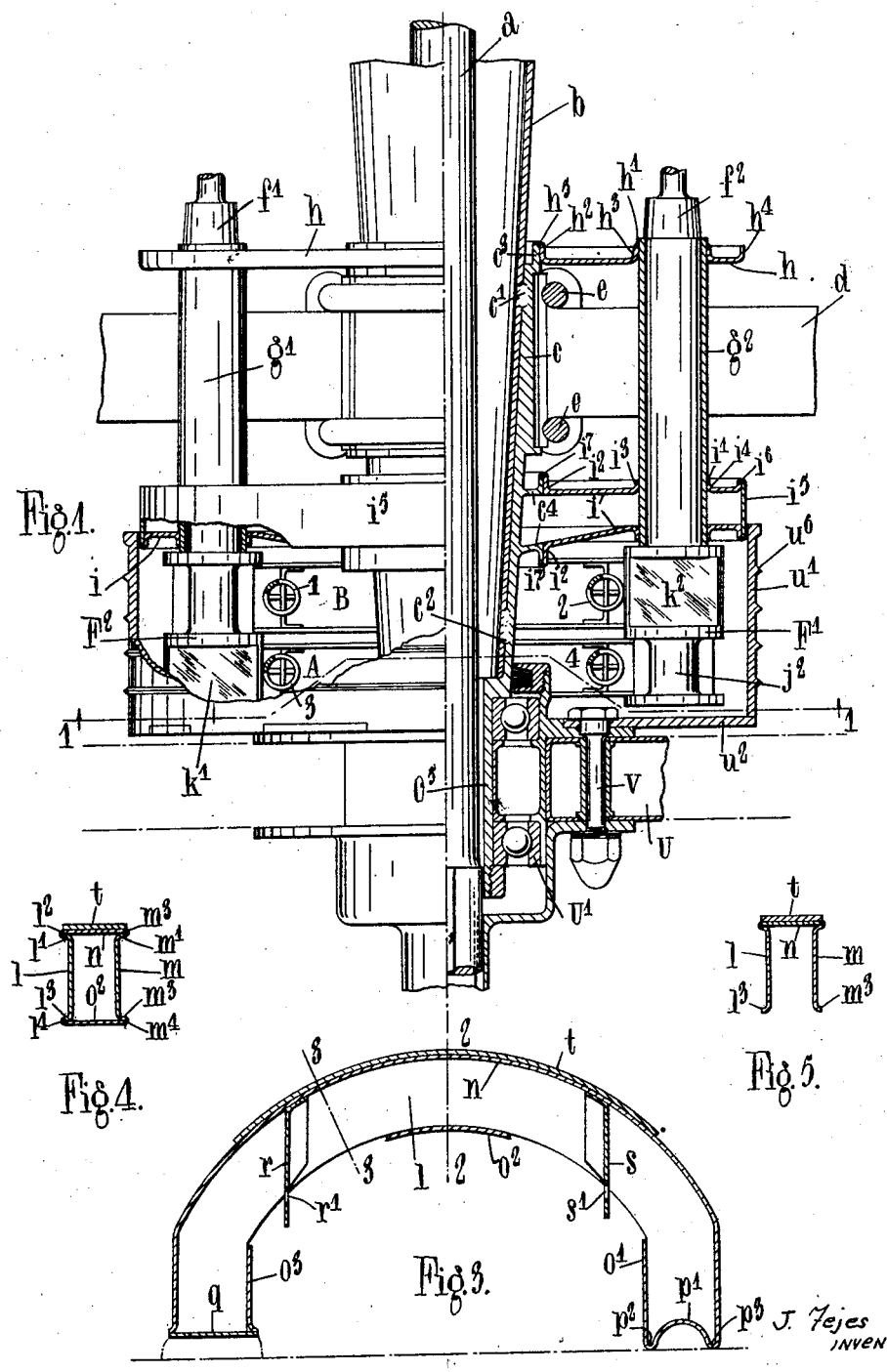
Figure 2:
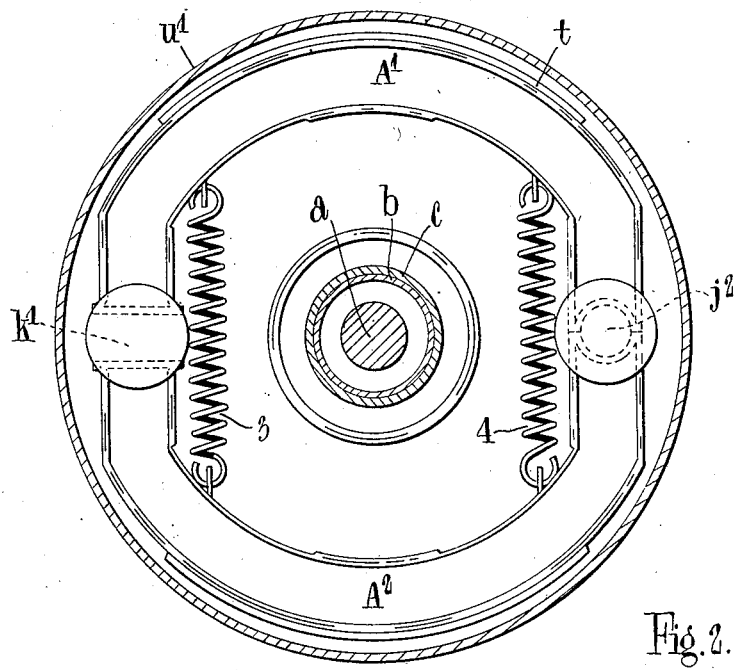
Figure 6:
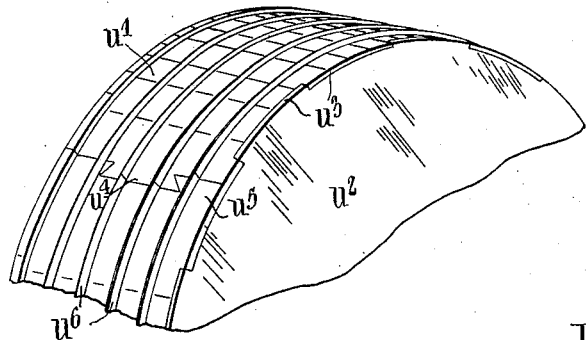
Figure 7:
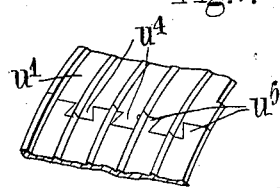

Referring to the accompanying drawings which illustrate the invention by way of example, Figure 1 is a part sectional plan of the improved construction and mounting of brake and parts associated therewith as applied to the rear axle of a motor vehicle, Figure 2 is a section along the line 1—1 in Fig. 1, Figure 3 is a sectional elevation of one of the brake shoes, Figures 4 and 5 are transverse sections along the lines 2—2, and 3—3 in Figure 3 respectively, Figure 6 is a perspective view of a portion of the brake drum, whilst Figure 7 is a detail illustrating a modification of the joint of the cylindrical part of the brake drum.

$a$ is a portion of one half of the driving axle and $b$ a portion of the tubular outer casing thereof. $c$ is a wrought iron boss on which the parts hereinafter more particularly referred to are mounted and which after the said parts have been attached thereto is slid onto the tubular outer casing $b$ and is spot welded to the said casing, for instance at $c_1$ and $c_2$. $d$ is one of the main plate springs which is fitted onto the boss $c$ by the usual means of connection, $e$ being fixing bolts. $f_1, f_2$ are two operating spindles intended to be connected in the usual way through the intermediary of operating levers and connecting rods (not shown) respectively to a hand lever and pedal provided at the front of the vehicle. The operation spindles $f_1$, $f_2$ are respectively mounted in tubes $g_1$, $g_2$ which are carried by two sheet metal supports $h$ and $i$ to which they are welded as shown at $h_1$ and $i_1$. The sheet metal support $h$ is flanged as shown at $h_2$, $h_3$ and $h_4$, whilst the sheet metal support $i$ is constructed in the form of a hollow box, being constituted of two annular metal sheets $i$, $i$ and a peripheral sheet metal band $i_5$, the two metal sheets $i$, $i$ being flanged as indicated at $i_2$, $i_3$ and $i_4$ and the peripheral band $i_2$ being edge welded thereto as indicated at $i_6$. The boss $c$ is provided with annular flanges $c_3$ and $c_4$ to which the supporting sheet metal plates $h$ and $i$ are edge welded as shown at $h_5$ and $i_7$ respectively.

A and B are the two brakes, each comprising a pair of shoes, such as shown at $A_1$ and $A_2$ in Figure 2. The pair of shoes of the brake A are mounted on the spindles $f_1, f_2$ in such a manner as to surround at one side the cylindrical portion $j_2$ of the spindle $f_2$ and abut at the other side against flat surfaces provided on a cam portion $k_1$ formed on the spindle $f_1$, whilst the shoes of the brake B are mounted in such a manner as to abut at one side against the flat surfaces of a cam portion $k_2$ formed on the spindle $f_2$ and at the other side surround a cylindrical portion $j_1$, of the spindle $f_1$. The two pairs of brakes are held in their normal inoperative position by means of springs 1, 2, 3, 4 and their operation is effected in the usual way by the rotation of the cam portions $k_1$, $k_2$ when the spindles $f_1$, $f_2$ are operated by the brake lever and pedal. $F_1$ and $F_2$ are two disc-shaped portions of the spindles $f_1$, $f_2$ which separate the cam portion $k_1$ or $k_2$ from the cylindrical portion $j_1$ or $j_2$.

The actual construction of the brake shoes is shown in Figures 2-5. Each brake shoe consists of two flanged side strips $l$, $m$ of sheet metal and an outer peripheral strip $n$ also of sheet metal which is edge welded onto the flanges $l_1$, $m_1$, of the side strips as shown at $l_2$ and $m_2$ respectively. The shoe is reinforced by inner strips of sheet metal $o_1$, $o_2$, $o_3$ which are edge welded onto the flanges $l_3$, $m_3$ of the side strips as shown for instance at $l_4$, $m_4$ in connection with the strip $o_2$. The one end of the brake shoe is formed with a half cylindrical portion $p_1$ of sheet metal provided with extensions $p_2$ and welded onto the four strips $l$, $m$, $n$ and $o_1$, whilst the other end thereof is provided with a sheet metal strip $q$ which is edge welded onto the four strips. $r$ and $s$ are further strengthening means of sheet metal provided in the interior of the shoe and welded onto the side strips $l$, $m$ and outer strip $n$, the said strips $r$ and $s$ serving to receive the ends of the springs 1, 2, 3, 4 for which purpose they are provided with eyes $r_1$, $s_1$. $t$ is the usual strip of Ferodo which is suitably secured to the strip $n$.

The brake drum is also made of sheet metal and it comprises in addition to the cylindrical brake portion $u_1$ a disc-like portion $u_2$ by which it is secured in the usual manner, such as by bolts $v$, to the wheel U of the vehicle, which is mounted on an extension $c_5$ of the boss $c$ in the usual way through the intermediary of ball bearings $U_1$. The two portions $u_1$ and $u_2$ of the brake drum are dove-tailed into one another as shown at $u_3$, being edge-welded all along the adjoining edges of the dove-tail connections. The cylindrical portion $u_1$ of the drum is made of a piece of sheet iron having the required width and length, its two ends being dove-tailed as shown at $u_4$ and $u_5$ and butt-welded all along the edge of the dove-tail connection. In this way the resistance of the drum to the stresses to which it is subjected is substantially increased. Further, the portion $u_1$ of the drum is formed with ribs $u_6$ which may be obtained by milling. Instead of one dove-tail, a plurality of such connections may be provided along the connecting ends of the strip of sheet metal used for the cylindrical portion $u_1$, for instance such as shown in Figure 7.

I wish it to be understood that the invention is not limited to the details hereinbefore given by way of example as the same may be modified in various respects without in any way departing from the spirit of the invention. Further, the invention is not limited to the application of the invention to the rear axle of a vehicle as it is equally applicable to the front axle thereof, in connection with which a brake according to the invention may be employed with special advantage as it greatly reduces the tendency of producing gyroscopic effects more particularly when steering.

What I claim is:—

1. A brake drum for wheels of motor and other vehicles comprising a cylindrical portion ($u_1$) and a disc-like portion ($u_2$), both portions being made of sheet-iron and edge-welded together and the said cylindrical portion ($u_1$) of sheet iron being made of a strip having dove-tailed ends butt-welded along the edges, as set forth.

2. A brake drum for wheels of motor and other vehicles comprising a cylindrical portion ($u_1$) and a disc-like portion ($u_2$) the two portions being made of sheet iron and dove-tailed into one another and being edge welded together along their dove-tailed connection, as set forth.

In testimony whereof I have signed my name to this specification.

JENÖ FEJES.